US008899039B2

(12) United States Patent  (10) Patent No.: US 8,899,039 B2
Mouri  (45) Date of Patent: Dec. 2, 2014

(54) RESERVOIR AND MASTER CYLINDER

(75) Inventor: Tomonori Mouri, Kai (JP)

(73) Assignee: Hitachi Automotive Systems, Ltd., Ibaraki (JP)

(*) Notice: Subject to any disclaimer, the term of this patent is extended or adjusted under 35 U.S.C. 154(b) by 888 days.

(21) Appl. No.: 13/072,957

(22) Filed: Mar. 28, 2011

(65) Prior Publication Data

US 2011/0265469 A1  Nov. 3, 2011

(30) Foreign Application Priority Data

Apr. 28, 2010  (JP) ............................... P2010-104226

(51) Int. Cl.
*B60T 11/26*  (2006.01)
(52) U.S. Cl.
CPC ..................... *B60T 11/26* (2013.01)
USPC .............................................. 60/585; 60/592
(58) Field of Classification Search
USPC ................................................... 60/585, 592
See application file for complete search history.

(56) References Cited

U.S. PATENT DOCUMENTS

| | | | | |
|---|---|---|---|---|
| 4,514,980 A | * | 5/1985 | Ishiwata | 60/592 |
| 6,571,556 B2 | * | 6/2003 | Shinohara et al. | 60/585 |
| 7,980,075 B2 | * | 7/2011 | Sato | 60/592 |
| 2008/0256948 A1 | | 10/2008 | Sato | |
| 2010/0229547 A1 | * | 9/2010 | Takahashi | 60/585 |

FOREIGN PATENT DOCUMENTS

| | | |
|---|---|---|
| JP | H1-123967 | 8/1989 |
| JP | 2008-265561 | 11/2008 |

OTHER PUBLICATIONS

Office Action Issued in Japanese Patent Appl 2010-104226 on Dec. 17, 2013 With English Language Translation.
Office Action issued in Chinese Patent Appl 201110077713.4 on May 6, 2014 along with English Language Translation of thereof.

* cited by examiner

*Primary Examiner* — Michael Leslie
(74) *Attorney, Agent, or Firm* — Nixon & Vanderhye P.C.

(57) ABSTRACT

Provided is a reservoir having first and second partitions. The first partitions partition a brake reservoir chamber and clutch reservoir chambers. The first partitions extend in a length direction of the vehicle and are formed uprightly along the sidewalls. The second partitions connect the first partitions and the sidewalls adjacent to the first partitions. The second partitions are formed uprightly at middle positions of the respective sidewalls in the length direction of the vehicle. The brake reservoir chamber and the clutch reservoir chambers are formed to face the sidewalls.

19 Claims, 9 Drawing Sheets

RESERVOIR AND MASTER CYLINDER

BACKGROUND OF THE INVENTION

1. Field of the Invention

The present invention relates to a reservoir and a master cylinder that is installed on a vehicle and stores fluid.

This application claims priority to and the benefits of Japanese Patent Application No. 2010-104226 filed on Apr. 28, 2010, the disclosure of which is incorporated herein by reference.

2. Description of Related Art

As reservoirs installed on a vehicle to store fluid, the one which includes a brake reservoir chamber connected to a brake master cylinder and a clutch reservoir chamber connected to a clutch master cylinder have been known (e.g. see Japanese Patent Unexamined Application, First Publication No. 2008-265561)

In the reservoirs as described above, in order to increase the degree of freedom of fluid discharge, forming the clutch reservoir chambers inside each sidewall of the reservoir which runs parallel to a length direction of the vehicle has been considered. However, in such a case, it may be difficult to obtain good visibility from the outside with respect to the level of stored fluid in the brake reservoir chamber.

SUMMARY OF THE INVENTION

The present invention provides a reservoir and a master cylinder which makes a level of stored fluid visible.

According to a first aspect of the present invention, a reservoir includes a reservoir body which has at least one pair of sidewalls; a brake reservoir chamber in which fluid is stored and which is connected to a brake master cylinder; clutch reservoir chambers which are partitioned from the brake reservoir chamber, in which fluid is stored, and which are connected to a clutch master cylinder; a connecting port which is formed on one of the sidewalls with which the clutch reservoir chambers are in contact; and partitions which partition the brake reservoir chamber and the clutch reservoir chambers. The partitions include first partitions and second partitions. The first partitions extend in a length direction of the vehicle and are formed uprightly along to the sidewalls, and the second partitions are formed uprightly at middle positions of the sidewalls in the length direction of the vehicle to connect the first partitions and the sidewalls adjacent to the first partitions and to bring the brake reservoir chamber and the clutch reservoir chambers into contact with the sidewalls.

According to a second aspect of the present invention, there is provided a reservoir having at least one pair of sidewalls. The reservoir includes: a brake reservoir chamber that is connected to a brake master cylinder by communication holes formed in a bottom part; clutch reservoir chambers that are partitioned from the brake reservoir chamber and are connected to a clutch master cylinder by a connecting port formed on one of the sidewalls; and partitions that include first partitions and second partitions which partition the brake reservoir chamber and the clutch reservoir chambers. The first partitions extend in an axial direction of the brake master cylinder and are formed uprightly along the sidewalls, and the second partitions are formed uprightly in a direction perpendicular to the axial direction of the brake master cylinder to connect the first partitions and the sidewalls adjacent to the first partitions and to bring the brake reservoir chamber and the clutch reservoir chambers into contact with the sidewalls.

According to a third aspect of the present invention, there is provided a brake master cylinder generating a brake fluid pressure. The brake master cylinder includes: a cylinder body having a hydraulic chamber in which a piston moves formed therein and attachment boss parts formed on an upper portion thereof; a reservoir that is attached to the attachment boss parts of the cylinder body and has a brake reservoir chamber and clutch reservoir chambers inside at least one pair of sidewalls; and partitions that include first partitions and second partitions which partition the brake reservoir chamber and the clutch reservoir chambers. The first partitions extend in an axial direction of the cylinder body and are formed uprightly along the sidewalls, and the second partitions are formed uprightly in a direction perpendicular to the axial direction of the cylinder body to connect the first partitions and the sidewalls adjacent to the first partitions and to bring the brake reservoir chamber and the clutch reservoir chambers into contact with the sidewalls.

The first partitions may be connected to a rear wall provided in a rear direction of the vehicle on an opposite side from a side connected with the second partitions.

The first partitions may include communication passages connecting the brake reservoir chamber and the clutch reservoir chambers to each other.

The first partitions and the second partitions may be formed uprightly so as to be symmetrical with respect to the sidewalls.

Each of the sidewalls may include a fluid level display line indicating the level of the fluid across the brake reservoir chamber and the clutch reservoir chamber.

The reservoir may further include a connecting partition, which is formed uprightly by connection between the first partitions and which connects the clutch reservoir chambers to each other.

The connecting partition may be formed spaced apart from a rear wall provided in a rear direction of the vehicle.

The connecting partition may be formed spaced apart from a front wall provided in a front direction of the vehicle.

One of the first partitions may include a communication passage connecting the brake reservoir chamber and the clutch reservoir chamber to each other.

According to the aspects of the present invention, it is possible to provide good visibility of the stored fluid in the reservoir.

DETAILED DESCRIPTION OF THE INVENTION

Hereinafter, each embodiment according to the present invention will be described with reference to the accompanying drawings.

[First Embodiment]

A reservoir according to a first embodiment of the present invention will be described with reference to FIGS. 1 to 9.

Figure 1:
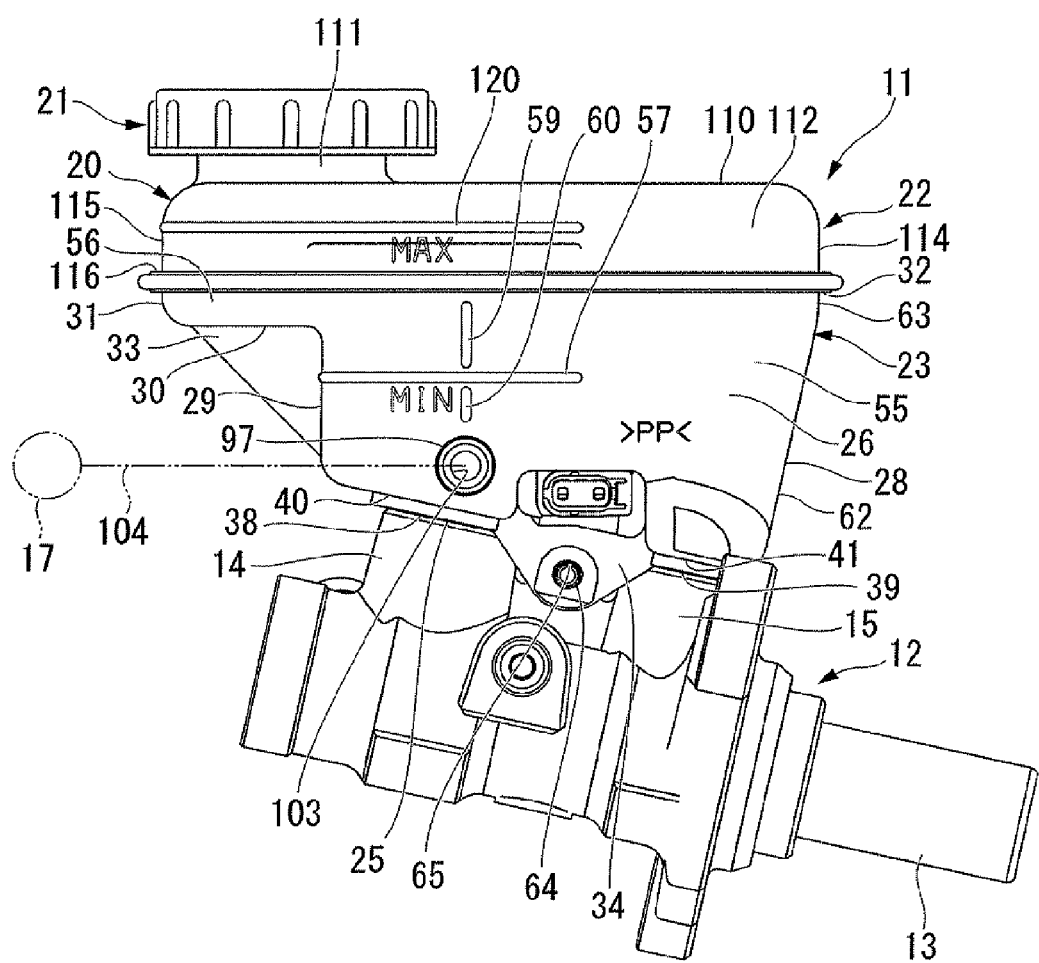
FIG. 1 is a side view showing a reservoir and a brake master cylinder according to a first embodiment of the present invention.

The reservoir 11 of the first embodiment is mounted on a vehicle such as a four-wheeled vehicle, and particularly, is mounted on the vehicle by attachment to a brake master cylinder 12 as shown in FIG. 1. The state shown in FIG. 1 refers to the state where the reservoir 11 and the brake master cylinder 12 are mounted on the vehicle. The reservoir 11 and the brake master cylinder 12 are mounted on the vehicle with the left side in FIG. 1 adopted as the front side when the vehicle moves forward. Further, in the following description, the front, rear, left and right refer to the front, rear, left and right of the vehicle when the vehicle moves forward.

The brake master cylinder 12 constitutes part of a brake apparatus that brakes wheels. The brake master cylinder 12 generates a brake fluid pressure, which is introduced into a wheel cylinder (not shown) that is installed on a wheel and generates a braking force, in a hydraulic chamber by means of a movement of a piston 13 which is driven in response to, for example, the brake operation of a driver. The brake master cylinder 12 is a tandem type in which two hydraulic chambers (not shown), which can generate the brake fluid pressure from a dual brake line, are provided in the front and rear. Meanwhile, the brake master cylinder is not limited to the tandem type, but may be a single type in which one hydraulic chamber is provided. Further, the brake master cylinder may be provided with two or more hydraulic chambers.

The brake master cylinder 12 is attached on a body of the vehicle in a posture that is slightly inclined in a front upward direction with respect to a horizontal line. The brake master cylinder 12 is provided with two front and rear attachment boss parts 14 and 15 at an upper portion thereof. The attachment boss parts 14 and 15 are configured so that top surfaces thereof are located on the same plane and are slightly inclined in a front upward direction with respect to a horizontal line. The attachment boss parts 14 and 15 are provided therein with passage holes (not shown), respectively, to which the reservoir 11 is attached and connect the inside of the reservoir 11 to the respective hydraulic chambers.

Fluid is stored in the reservoir 11. The reservoir 11 supplies the fluid to the aforementioned brake master cylinder 12 and a clutch master cylinder 17. The clutch master cylinder 17 constitutes part of a clutch apparatus that connects or disconnects a driving force transmission path between an engine and wheels. The clutch master cylinder 17 assists an operating force for clutch operation of a driver.

The reservoir 11 includes a reservoir body 20 that is formed of synthetic resin having optical transparency and is shown in FIGS. 1 to 4 and a lid 21 that is formed of synthetic resin, is detachably connected to the reservoir body 20, and is shown in FIG. 1. The reservoir body 20 is configured so that an upper constituent body 22 that is a one-piece molding and a lower constituent body 23 that is a one-piece molding are integrally molded by, for example, welding.

Figure 2:
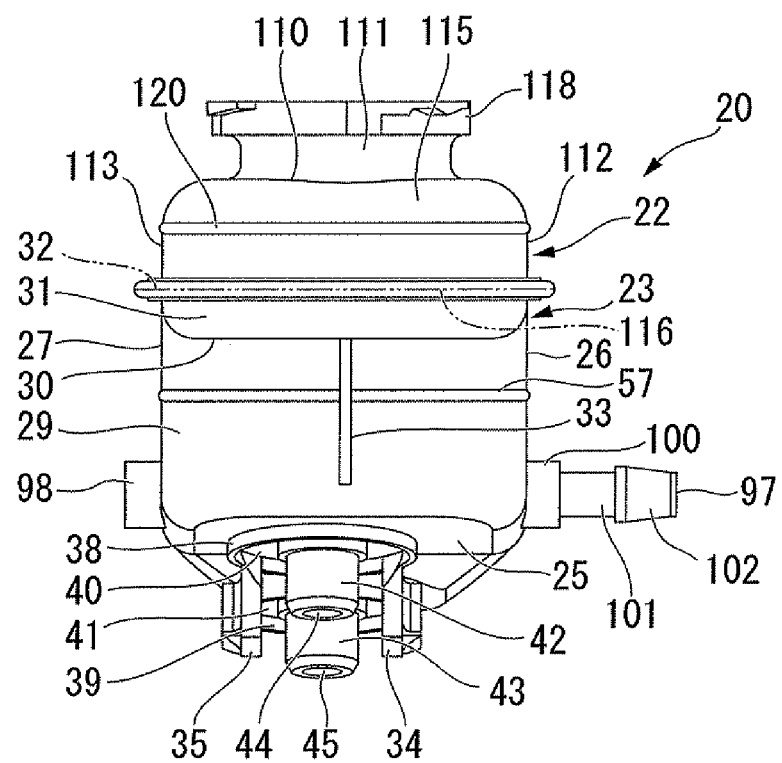
FIG. 2 is a front view showing a reservoir body of the reservoir according to the first embodiment of the present invention.
Figure 3:
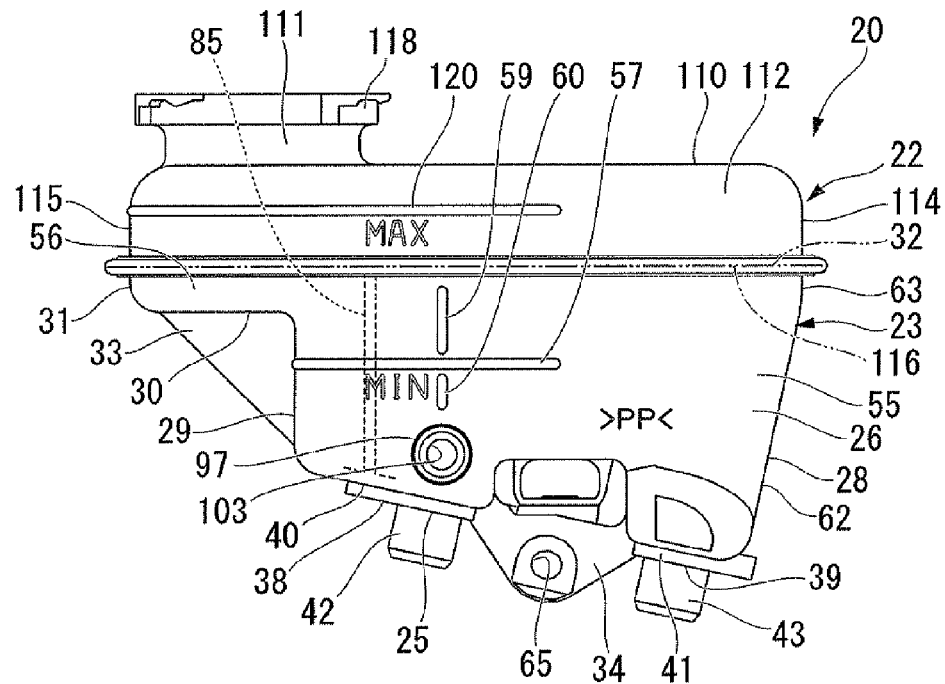
FIG. 3 is a side view showing a reservoir body of the reservoir according to the first embodiment of the present invention.
Figure 4:
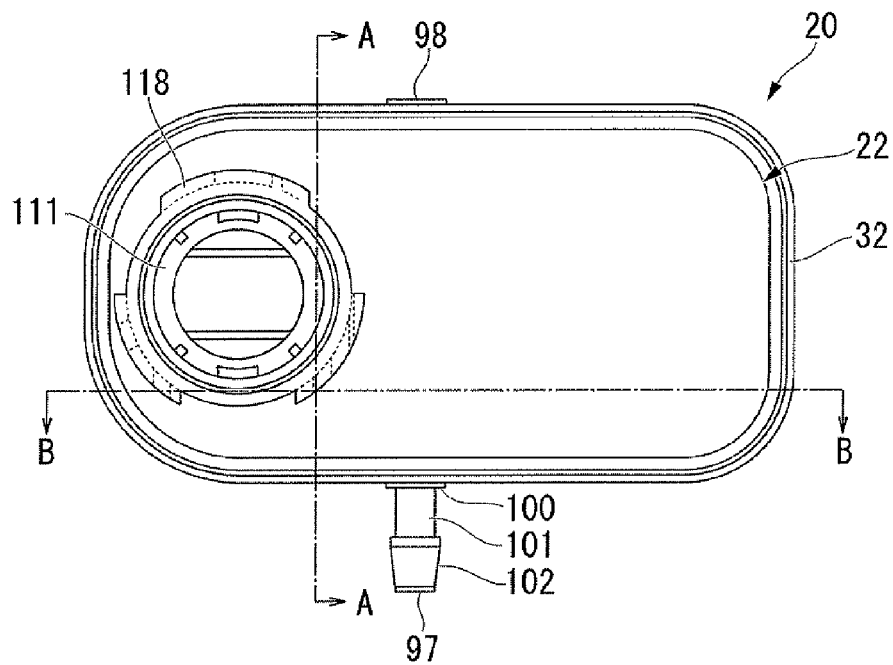
FIG. 4 is a plan view showing a reservoir body of the reservoir according to the first embodiment of the present invention.

The lower constituent body 23 includes: a main bottom part 25 shown in FIGS. 2 and 3; a pair of plate-like sidewall parts 26 and 27 shown in FIG. 2; a plate-like rear wall part 28 shown in FIG. 3; a plate-like intermediate front wall part 29, a plate-like front bottom part 30, a plate-like front end wall part 31, a joint flange part 32, and a reinforcing plate part 33 shown in FIGS. 2 and 3; and a pair of connecting plate parts 34 and 35 shown in FIG. 2.

The main bottom part 25 includes, as shown in FIG. 1, a front mount part 38 and a rear mount part 39 that are mounted on the front and rear attachment boss parts 14 and 15 of the brake master cylinder 12, respectively. The front and rear mount parts 38 and 39 are configured so that bottom surfaces thereof are mounted on the top surfaces of the attachment boss parts 14 and 15 disposed on the same plane. To this end, the bottom surfaces of the front and rear mount parts 38 and 39 are disposed on the same plane, and are slightly inclined in a front upward direction with respect to the horizontal line.

The main bottom part 25 includes, as shown in FIGS. 1 and 2, a plate-like front bottom part 40 that is parallel to the bottom surface of the front mount part 38 at a base-end position of the front mount part 38. The main bottom part 25 also includes a plate-like rear bottom part 41 that is parallel to the bottom surface of the rear mount part 39 at a base-end position of the rear mount part 39. As shown in FIG. 2, the front bottom part 40 is provided with an attachment projection 42, which protrudes downward from the front bottom part 40 in a vertical direction, at an inner position of the front mount part 38. The rear bottom part 41 is provided with an attachment projection 43, which protrudes downward from the rear bottom part 41 in a vertical direction, at an inner position of the rear mount part 39.

The attachment projection 42 is provided with a communication hole 44 in the center thereof which passes from the inside to the outside of the reservoir body 20. The attachment projection 43 is also provided with a communication hole 45 in the center thereof which passes from the inside to the outside of the reservoir body 20. The attachment projections 42 and 43 of the reservoir body 20 are fitted into the passage holes (not shown) of the attachment boss parts 14 and 15 of the brake master cylinder 12 shown in FIG. 1. The reservoir body 20 is allowed to communicate with the hydraulic chambers of the brake master cylinder 12 via the passage holes of the attachment boss parts 14 and 15.

Figure 6:
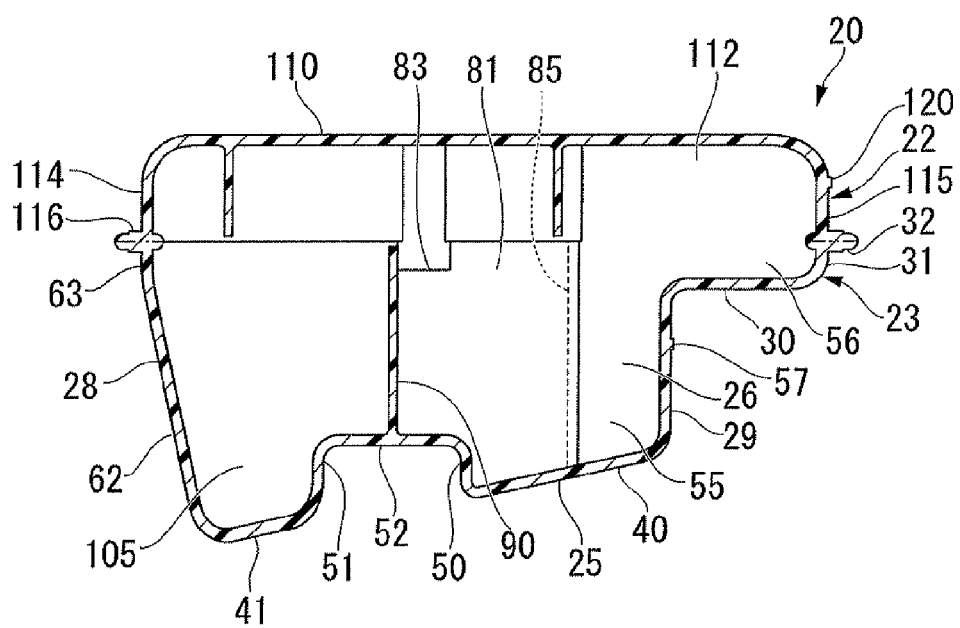
FIG. 6 is a cross-sectional view taken along line B-B of FIG. 4.

As shown in FIG. 6, the main bottom part 25 includes a front plate part 50 that extends upward from a rear edge of the front bottom part 40 in a vertical direction, a rear plate part 51 that extends upward from a front edge of the rear bottom part 41 in a vertical direction, and a bottom plate part 52 that extends in a horizontal direction to connect upper edges of the front and rear plate parts 50 and 51 to each other.

Figure 5:
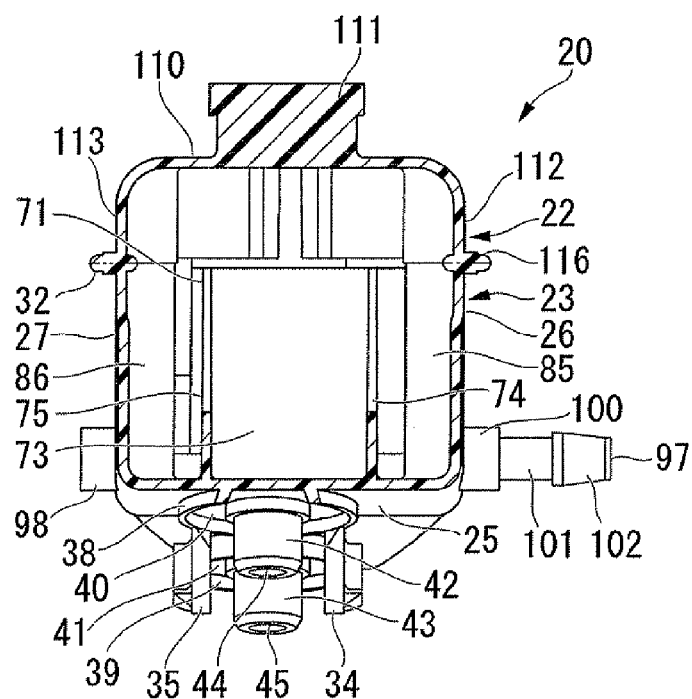
FIG. 5 is a cross-sectional view taken along line A-A of FIG. 4.

As shown in FIG. 5, the pair of sidewall parts 26 and 27 face the outside on both the left and right sides of the reservoir body 20 (i.e. the reservoir 11). The pair of sidewall parts 26 and 27 extend upward from the opposite left and right lateral edges of the main bottom part 25 to a predetermined position of a constant height in a vertical direction in a posture that extends in a length direction. The pair of sidewall parts 26 and 27 are formed in a left-right symmetric shape. As shown in FIG. 3, the sidewall parts 26 and 27 include main sidewall parts 55 that extend from the lateral edges of the main bottom part 25 to a position of the same height in an upward direction and with approximately the same length in a length direction, and extension sidewall parts 56 that extend from upper ends of the main sidewall parts 55 in a forward direction of the vehicle.

Each of the pair of sidewall parts 26 and 27 is provided with a lowest fluid-level display line (a fluid-level display line) 57 on an outer surface thereof which indicates a lowest fluid level and protrudes to the outside. The lowest fluid-level display line 57 is formed on the main sidewall part 55 and is located below the extension sidewall part 56. The lowest fluid-level display line 57 is formed in a horizontal direction to extend forwardly from an approximately length middle position of the main sidewall part 55 of the sidewall part 26, to run across the intermediate front wall part 29 in a width direction as shown in FIG. 2, and to extend backwardly from the sidewall part 27 to the same position as the sidewall part 26.

In each of the pair of sidewall parts 26 and 27, as shown in FIG. 3 for only the sidewall part 26, the main sidewall part 55 is embossed outwardly with a mark "MIN," which represents a lowest fluid level, below the lowest fluid-level display line 57. Further, the main sidewall part 55 of each of the pair of sidewall parts 26 and 27 is provided with display lines 59 and 60 on upper and lower sides of the middle of the lowest fluid-level display line 57 in a height direction, wherein the display lines 59 and 60 protrude outwards. Thus, the display lines 59 and 60 are formed to extend in a vertical direction.

The rear wall part 28 faces the outside at the rear portion of the reservoir body 20 (i.e. the reservoir 11). The rear wall part 28 includes a main rear wall part 62 that extends from a rear edge of the main bottom part 25 to be slightly inclined in a rear upward direction, and an upper-end rear wall part 63 that protrudes upward from an upper edge of the main rear wall part 62 in a vertical direction. The rear wall part 28 extends in a width direction to connect the rear edges of the pair of sidewall parts 26 and 27 to each other. The rear wall part 28 is formed up to a predetermined position of the same constant height as the pair of sidewall parts 26 and 27.

The intermediate front wall part 29 extends upward from the front edge of the main bottom part 25 in a vertical direction. The intermediate front wall part 29 extends in a width direction to connect the front edges of the main sidewall parts 55 of the pair of sidewall parts 26 and 27 to each other. The intermediate front wall part 29 is formed up to a lower end position of the pair of extension sidewall parts 56.

The front bottom part 30 extends from an upper edge of the intermediate front wall part 29 in a horizontal forward direction. The front bottom part 30 extends in a width direction to connect lower edges of the extension sidewall parts 56 of the pair of sidewall parts 26 and 27 to each other. The front bottom part 30 is formed up to a front end position of the extension sidewall parts 56.

The front end wall part 31 protrudes upward from the front edge of the front bottom part 30 in an approximately vertical direction. The front end wall part 31 extends in a width direction to connect front edges of the extension sidewall parts 56 of the pair of sidewall parts 26 and 27 to each other. The front end wall part 31 is formed up to a predetermined position of the same constant height as the extension sidewall parts 56.

The intermediate front wall part 29, the front bottom part 30, and the front end wall part 31 face the outside in a step shape at the front portion of the reservoir body 20 (i.e. the reservoir 11).

The joint flange part 32 protrudes from all continuous upper edges of the pair of sidewall parts 26 and 27, the rear wall part 28, and the front end wall part 31 to opposite inner and outer sides. The joint flange part 32 is disposed on the same horizontal plane.

As shown in FIG. 2, the reinforcing plate part 33 is formed at a width middle position of the intermediate front wall part 29 and the front bottom part 30 in a vertical direction to connect them to each other. As shown in FIG. 3, a front surface of the reinforcing plate part 33 is inclined in a front upward direction to connect a lower end of the intermediate front wall part 29 and a front end of the front bottom part 30 to each other in a linear shape.

As shown in FIG. 2, the pair of connecting plate parts 34 and 35 protrude downward from the main bottom part 25 in a vertical direction. The connecting plate parts 34 and 35 are parallel to each other in a width direction in a posture that extends in a length direction. The connecting plate parts 34 and 35 are provided with insertion holes 65 into which a pin 64 (shown in FIG. 1) for attachment to the brake master cylinder 12 is inserted.

Figure 7:
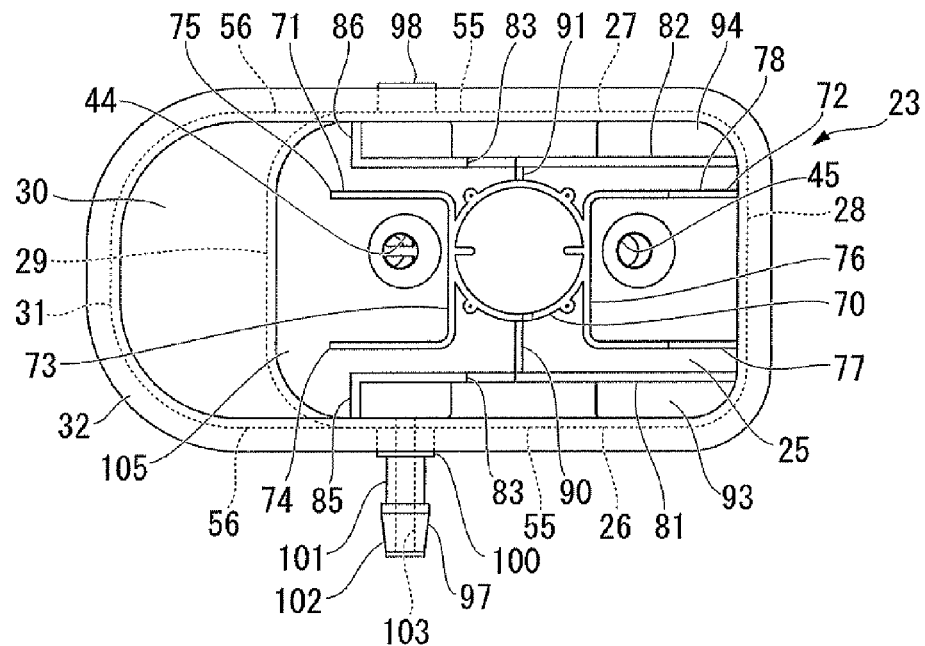
FIG. 7 is a plan view showing a lower constituent body of the reservoir according to the first embodiment of the present invention.

As shown in FIG. 7, the lower constituent body 23 is provided therein with a float guide part 70, a front inner wall part 71, and a rear inner wall part 72.

The float guide part 70 has an approximately cylindrical shape, and protrudes upward from the main bottom part 25 in a vertical direction. A float switch (not shown) for checking fluid shortage is inserted into the float guide part 70 to be liftable.

The front inner wall part 71 includes a plate part 73 that extends upward from the main bottom part 25 in a vertical direction to be in contact with a front end of the float guide part 70 in a posture that extends in a width direction, and a pair of plate parts 74 and 75 that extend from opposite end edges of the plate part 73 in a forward direction in a posture that extends in a vertical direction. The communication hole 44 is disposed within a range inside the front inner wall part 71.

The rear inner wall part 72 includes a plate part 76 that extends upward from the main bottom part 25 in a vertical direction to be in contact with a rear end of the float guide part 70 in a posture that extends in a width direction, and a pair of plate parts 77 and 78 that extend from opposite end edges of the plate part 76 in a backward direction in a posture that extends in a vertical direction. The communication hole 45 is disposed within an inner region of the rear inner wall part 72.

Further, the lower constituent body 23 is provided with a pair of partitions (first partitions) 81 and 82 between the float guide part 70, the front inner wall part 71 and the rear inner wall part 72 and the sidewall parts 26 and 27, respectively. Both the partition 81 on the side of the sidewall part 26 and the partition 82 on the side of the sidewall part 27 are formed between a length middle position and a rear portion of the lower constituent body 23. These partitions 81 and 82 extend upward from the main bottom part 25 in a vertical direction in a posture that extends in a length direction. That is, the pair of partitions 81 and 82 are formed uprightly to run alongside the respective sidewall parts 26 and 27 in a posture that extends in a length direction of the vehicle. Each of the partitions 81 and 82 is connected to the rear wall part 28 at a rear end edge thereof throughout its height. A front end edge of each of the partitions 81 and 82 extends in a vertical direction and are spaced apart from the intermediate front wall part 29. Each of the partitions 81 and 82 is provided with a rectangular notch part 83 (shown in FIG. 6) at a length middle position of an upper portion thereof. An upper edge of each of the partitions 81 and 82 has a predetermined height equal to that of the joint flange part 32, except the notch part 83. A lower end of the notch part 83 is located above the lowest fluid-level display line 57 shown in FIG. 3. The notch part 83 constitutes a communication passage that communicates between a brake reservoir chamber 105 and clutch reservoir chambers 93 and 94, which will be described below.

As shown in FIG. 7, the lower constituent body 23 is provided with a pair of partitions (second partitions) 85 and 86 at front positions of the partitions 81 and 82. Each of the partitions 85 and 86 extend upward from the main bottom part 25 in a vertical direction in a posture that extends in a width direction. One partition 85 is configured so that one end edge thereof on the side of the adjacent sidewall part 26 is connected to the sidewall part 26 throughout its height, and so that the other end edge thereof is connected to a front edge of the adjacent partition 81 throughout its height. The other partition 86 is configured so that one end edge thereof on the side of the adjacent sidewall part 27 is connected to the sidewall part 27 throughout its height, and so that the other end edge thereof is connected to a front edge of the adjacent partition 82 throughout its height. Each of the partitions 85 and 86 has a predetermined height equal to that of the joint flange part 32.

The aforementioned partitions 81 and 82 and partitions 85 and 86 are formed uprightly in symmetry with respect to the sidewall parts 26 and 27. In detail, the sidewall part 26, the partition 81 and the partition 85 and the sidewall part 27, the partition 82 and the partition 86 have a mirror symmetrical shape with respect to a plane that passes through the a center of the lower constituent body 23 in the width direction.

Here, since the front edges of the partitions 81 and 82 are located on the side of the rear wall part 28 rather than the intermediate front wall part 29, the partitions 85 and 86 are also located on the side of the rear wall part 28 rather than the intermediate front wall part 29. As a result, the partitions 85 and 86 are connected to the main sidewall parts 55 corresponding to the sidewall parts 26 and 27 on the front side of the main sidewall parts 55 rather than a center positions of the main sidewall parts 55 in the length direction. In detail, the partitions 85 and 86, which connect the partitions 81 and 82 and the sidewall parts 26 and 27 adjacent to the partitions 81 and 82, are formed uprightly on the front side of the sidewall parts 26 and 27 rather than the middle positions of the sidewall parts 26 and 27 in a length direction of the vehicle, respectively. Each of the partitions 85 and 86 has a constant height equal to that of the upper edge of each of the partitions 81 and 82, except the notch part 83 of each of the partitions 81 and 82.

The float guide part 70 of the lower constituent body 23 is provided with a pair of connecting walls 90 and 91 on opposite left and right sides thereof. Each of the connecting walls 90 and 91 extends upward from the main bottom part 25 in a vertical direction in a posture that extends in a width direction. One connecting wall 90 is configured so that one end edge thereof on the side of the adjacent partition 81 is connected to the partition 81 throughout its height, and so that the other end edge thereof is connected to the float guide part 70. The other connecting wall 91 is configured so that one end edge thereof on the side of the adjacent partition 82 is connected to the partition 82 throughout its height, and so that the other end edge thereof is connected to the float guide part 70.

The notch part 83 of each of the partitions 81 and 82 is configured so that a rear end thereof is aligned with a front surface of each of the connecting walls 90 and 91.

One clutch reservoir chamber 93 is defined by and inside the partitions 81 and 85 and a rear region of the sidewall part 26 rather than the partition 85, all of which are located on the same side in the width direction. The other clutch reservoir chamber 94 is defined by and inside the partitions 82 and 86 and a rear region of the sidewall part 27 rather than the partition 86, all of which are located on the other side in the width direction. The pair of clutch reservoir chambers 93 and 94 also have a mirror symmetrical shape with respect to a plane that passes through a center of the lower constituent body 23 in a width direction.

Figure 8:
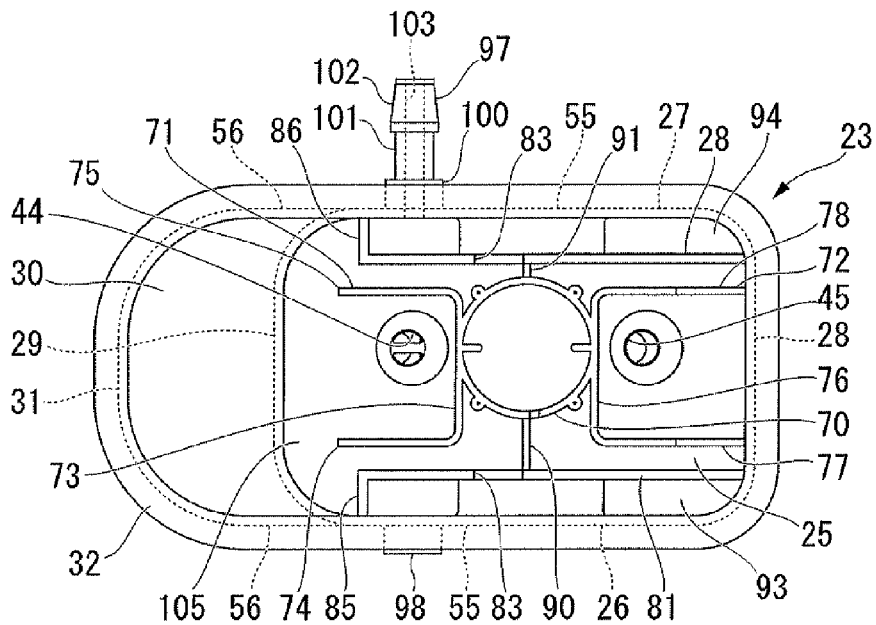
FIG. 8 is a plan view showing another lower constituent body of the reservoir according to the first embodiment of the present invention.

As shown in FIGS. 7 and 8, one of the sidewall parts 26 and 27 is provided with a connecting port 97 that protrudes in a direction perpendicular thereto. The other of the sidewall parts 26 and 27 is provided with a projection 98 that is shorter than the connecting port 97 and protrudes in a cylindrical shape in a direction perpendicular thereto. When the connecting port 97 and the projection 98 are formed on the sidewall part 26, they are formed at a position where their lower portions face the clutch reservoir chamber 93. When the connecting port 97 and the projection 98 are formed on the sidewall part 27, they are formed at a position where their lower portions face the clutch reservoir chamber 94. In other words, when the connecting port 97 and the projection 98 are formed on the sidewall part 26, they are formed between the partition 85 and the rear wall part 28 of the sidewall part 26. When the connecting port 97 and the projection 98 are formed on the sidewall part 27, they are formed between the partition 86 and the rear wall part 28 of the sidewall part 27.

The connecting port 97 is sequentially made up of a base part 100, an intermediate extension part 101, and a head part 102 starting from a base end thereof. The base part 100 is formed in a cylindrical shape, and has the same outer diameter and length as the projection 98. The intermediate extension part 101 is formed in a cylindrical shape on the same axis as the base part 100, and is thinner than the base part 100. The head part 102 is formed in a tapered conical shape on the same axis as the intermediate extension part 101, and has a large-diameter portion greater than the intermediate extension part 101.

The connecting port 97 is provided with a through-hole 103 in the center thereof. When the connecting port 97 is formed on the sidewall part 26 as shown in FIG. 7, the through-hole 103 causes the clutch reservoir chamber 93, which faces the sidewall part 26 on the side where the connecting port 97 is formed, to communicate with the outside. When the connecting port 97 is formed on the sidewall part 27 as shown in FIG. 8, the through-hole 103 causes the clutch reservoir chamber 94, which faces the sidewall part 27 on the side where the connecting port 97 is formed, to communicate with the outside. A hose 104, one end of which is connected to the clutch master cylinder 17 shown in FIG. 1, is connected to the connecting port 97 at the other end thereof. Thus, as shown in FIGS. 7 and 8, one of the clutch reservoir chambers 93 and 94, which faces one of the sidewall parts 26 and 27 on which the connecting port 97 is formed, is connected to the clutch master cylinder 17.

The connecting port 97 and the projection 98 are aligned with each other in a length direction and in a height direction. Further, the lower constituent body 23 is configured so that the relationship between the connecting port 97 and the projection 98 for left-hand drive vehicles is reversed for right-hand drive vehicles.

Although not shown, a die for injection-molding the lower constituent body 23 includes a connecting port forming mold having a cavity for forming the connecting port 97, a projection forming mold having a cavity for forming the projection 98, an outer mold having a cavity for forming an outer portion in addition to these, and an inner mold for forming an inner portion. As shown in FIG. 7, when the connecting port 97 is formed on the left side, and the projection 98 is formed on the right side, the connecting port forming mold and the projection forming mold are attached to the left and right sides of the outer mold, respectively. As shown in FIG. 8, when the connecting port 97 is formed on the right side, and the projection 98 is formed on the left side, the connecting port forming mold and the projection forming mold are attached to the right and left sides of the outer mold, respectively. In other words, in the lower constituent body 23 for left-hand drive vehicles and the lower constituent body 23 for right-hand drive vehicles, the outer mold, the inner mold, the connecting port forming mold, and the projection forming mold are used in common, but the positions of the connecting port forming mold and the projection forming mold are merely switched. Thereby, the configuration is altered. The through-hole 103 of the connecting port 97 is formed by inserting a rod-like mold when injection-molded.

Figure 9:
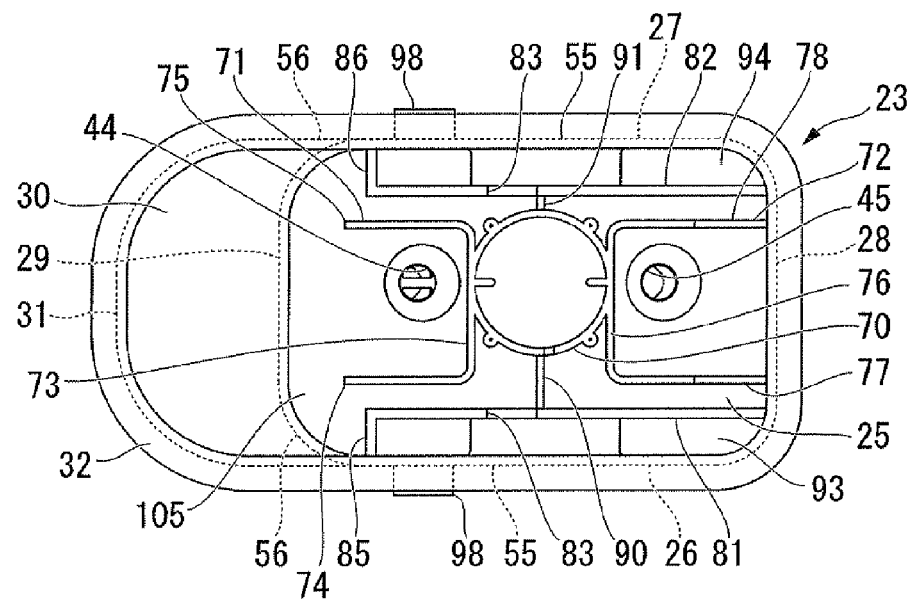
FIG. 9 is a plan view showing another lower constituent body of the reservoir according to the first embodiment of the present invention.

Further, as a technical reference, if the projection forming molds are attached to the outer mold on both the right side and the left side, it may be possible to form the lower constituent body 23 of the reservoir, which is not connected to the clutch master cylinder 17, and on both sides of which the projections 98 are formed as shown in FIG. 9. That is, using the common molds, the lower constituent body 23 for left-hand drive vehicles which is connected with the clutch master cylinder 17, the lower constituent body 23 for right-hand drive vehicles which is connected with the clutch master cylinder 17, and the common lower constituent body 23 for left-hand and right-hand drive vehicles which is not connected with the clutch master cylinder 17 may be manufactured.

As shown in FIG. 7, in the lower constituent body 23, a brake reservoir chamber 105 is defined by and inside the pair of partitions 81 and 82, the pair of partitions 85 and 86, the rear wall part 28, the intermediate front wall part 29, the front bottom part 30, the front end wall part 31, and the front regions of the sidewall parts 26 and 27 rather than the partitions 85 and 86. In other words, the brake reservoir chamber 105, the clutch reservoir chamber 93, and the clutch reservoir chamber 94 are partitioned with the pair of partitions 81 and 82 and the pair of partitions 85 and 86.

Thereby, the sidewall part 26 faces the brake reservoir chamber 105 on the front side rather than the partition 85, and the clutch reservoir chamber 93 on the rear side rather than the partition 85. Further, the sidewall part 27 faces the brake reservoir chamber 105 on the front side rather than the partition 86, and the clutch reservoir chamber 94 on the rear side rather than the partition 86. That is, the brake reservoir chamber 105 and the clutch reservoir chamber 93 are formed to face the sidewall part 26, while the brake reservoir chamber 105 and the clutch reservoir chamber 94 are formed to face the sidewall part 27. The lowest fluid-level display line 57 indicating the fluid level (e.g. shown in FIG. 3) is formed between a position that faces the clutch reservoir chamber 93 and a position that faces the brake reservoir chamber 105 at the sidewall part 26 and between a position that faces the clutch reservoir chamber 94 and a position that faces the brake reservoir chamber 105 at the sidewall part 27.

The upper constituent body 22 includes a plate-like upper plate part 110, an inlet 111, a pair of plate-like sidewall parts 112 and 113 (shown in FIG. 2), a plate-like rear wall part 114, a plate-like front wall part 115, and a joint flange part 116 (shown in FIG. 3).

The upper plate part 110 is disposed in a horizontal direction. The upper plate part 110 is configured so that left and right lateral edges thereof extend in a length direction, and so that front and rear edges thereof extend in a width direction. The inlet 111 has a cylindrical shape, and is formed to protrude in an upward direction from a center position of the front of the upper plate part 110 in the width direction. The inlet 111 is provided with a flange-like engagement part 118 at an upper end thereof which is engaged with a lid 21.

The pair of plate-like sidewall parts 112 and 113 (shown in FIG. 2) face the outside on both the left and right sides of the reservoir body 20 (i.e. the reservoir 11). The pair of plate-like sidewall parts 112 and 113 extend from the left and right lateral edges of the upper plate part 110 up to a predetermined position of a constant height in a vertical direction in a posture that extends in a length direction. Each of the plate-like sidewall parts 112 and 113 is provided with a highest fluid-level display line 120 on an outer surface thereof which indicates a highest fluid level and protrudes to the outside. The highest fluid-level display line 120 is formed in a horizontal direction to extend forwardly from a middle position of the sidewall part 112 in a length direction as shown in FIG. 3, to run across the front wall part 115 in a width direction as shown in FIG. 2, and to extend backwardly from the sidewall part 113 to the same position as the sidewall part 112. In each of the pair of sidewall parts 112 and 113, as shown in FIG. 3 for only the sidewall part 112, a mark "MAX," which represents a highest fluid level, is embossed outwardly below the highest fluid-level display line 120.

The rear wall part 114 extends downward from a rear edge of the upper plate part 110 in a vertical direction. The rear wall part 114 extends in a width direction to connect rear edges of the pair of sidewall parts 112 and 113 to each other, and extends up to a predetermined position of a constant height equal to those of the pair of sidewall parts 112 and 113.

The front wall part 115 extends downward from a front edge of the upper plate part 110 in a vertical direction. The front wall part 115 extends in a width direction to connect front edges of the pair of sidewall parts 112 and 113 to each other, and extends up to a predetermined position of a constant height equal to those of the pair of sidewall parts 112 and 113.

The joint flange part 116 protrudes from all continuous lower edges of the pair of sidewall parts 112 and 113, the rear wall part 114, and the front wall part 115 to both inner and outer sides. The joint flange part 116 is disposed on the same horizontal plane. The joint flange part 116 has the same shape as the joint flange part 32 of the lower constituent body 23.

The joint flange part 116 of the upper constituent body 22 and the joint flange part 32 of the lower constituent body 23 are joined throughout their circumferences with the float switch (not shown) inserted in the float guide part 70. Thereby, the reservoir body 20 is formed. The upper constituent body 22 and the lower constituent body 23 of the reservoir body 20 are configured so that, as shown in FIG. 2, the sidewall part 112 and the sidewall part 26 are disposed on the same plane, and the sidewall part 113 and the sidewall part 27 are disposed on the same plane, and so that, as shown in FIG. 3, the front wall part 115 and the front end wall part 31 are disposed on the same plane, and the rear wall part 114 and the upper-end rear wall part 63 are disposed on the same plane. Further, due to this arrangement, the rear end of the lowest fluid-level display line 57 and the rear end of the highest fluid-level display line 120 are aligned with each other in a length direction.

Fluid is injected into the reservoir body 20 from the inlet 111. The injected fluid is filled in the brake reservoir chamber 105 disposed below the inlet 111 in a vertical direction. When the fluid exceeds lower end levels of the notch parts 83 of the partitions 81 and 82 in the brake reservoir chamber 105, the fluid is filled in both the clutch reservoir chambers 93 and 94 via the notch parts 83. When the fluid is filled in the reservoir body 20 in this way, the fluid level of the brake reservoir chamber 105 on the front side of the sidewall parts 26 and 27 rather than the partitions 85 and 86 is indicated, and the fluid level of the clutch reservoir chamber 93 on the rear side of the sidewall part 26 rather than the partition 85, and the fluid level of the clutch reservoir chamber 94 on the rear side of the sidewall part 27 rather than the partition 86 are indicated.

Thereby, the inlet 111 of the reservoir body 20 filled with the fluid is closed by the lid 21 engaged with the engagement part 118 of the upper portion thereof.

In the reservoir disclosed in Japanese Patent Unexamined Application, First Publication No. 2008-265561, the clutch reservoir chamber is formed in line with the direction of the connecting port for discharging fluid to the clutch master cylinder. However, the left and right attaching positions of the reservoir and the brake master cylinder for the left-hand drive vehicles and the right-hand drive vehicles may be different from each other. In this case, the left and right directions of the connecting port for discharging fluid to the clutch master cylinder are also made different. Even when the left and right directions of the connecting port are made different in this way, for the purpose of causing the other parts of the reservoir to be used in common, forming the clutch reservoir chambers inside the left and right sidewalls of the reservoir which extend in a length direction of the vehicle can be considered. However, when the clutch reservoir chambers are provided inside the left and right sidewalls of the reservoir which extend in a length direction of the vehicle, although it is possible to observe a level of the fluid of the clutch reservoir chamber from the outside, it may be impossible to obtain good visibility from the outside with respect to the level of the fluid of the brake reservoir chamber.

In contrast, according to the first embodiment described above, both the partition 81 that partitions the brake reservoir chamber 105 and the clutch reservoir chamber 93 and the partition 82 that partitions the brake reservoir chamber 105 and the clutch reservoir chamber 94 are formed uprightly in a length direction of the vehicle to run parallel to the sidewall parts 26 and 27. The partition 85, which connects the partition 81 and the sidewall part 26 adjacent to the partition 81, is formed uprightly at the middle position of the sidewall part 26 in a length direction of the vehicle, and is thereby formed so that the brake reservoir chamber 105 and the clutch reservoir chamber 93 face the sidewall part 26. The partition 86, which connects the partition 82 and the sidewall part 27 adjacent to the partition 82, is formed uprightly at the middle position of the sidewall part 27 in a length direction of the vehicle, and is thereby formed so that the brake reservoir chamber 105 and the clutch reservoir chamber 94 face the sidewall part 27. The connecting port 97 connected to the clutch master cylinder 17 is formed on one of the sidewall part 26 which the clutch reservoir chamber 93 faces and the sidewall part 27 which the clutch reservoir chamber 94 faces. As such, the good visibility from the outside is obtained with respect to the levels of the fluid of the clutch reservoir chambers 93 and 94 as well as the level of the fluid of the brake reservoir chamber 105.

Further, the partition 81 and the partition 85, and the partition 82 and the partition 86 are formed uprightly to be symmetrical with respect to the sidewall parts 26 and 27, respectively. As such, the clutch reservoir chamber 93 defined by the partition 81, the partition 85, and the sidewall part 26 and the clutch reservoir chamber 94 defined by the partition 82, the partition 86, and the sidewall part 27 can have the same volume. Accordingly, even when the connecting port 97 is formed on one of the sidewall parts 26 and 27, it is possible to connect the clutch master cylinder to the clutch reservoir chamber having the same volume.

Further, the lowest fluid-level display line 57, which indicates the level of fluid across the brake reservoir chamber 105 and the clutch reservoir chamber 93, is formed on the sidewall part 26. The lowest fluid-level display line 57, which indicates the level of fluid across the brake reservoir chamber 105 and the clutch reservoir chamber 94, is also formed on the sidewall part 27. As such, it is possible to manage the levels of fluid of the clutch reservoir chambers 93 and 94 as well as the level of the fluid of the brake reservoir chamber 105 in an easy and proper manner.

In the present embodiment, the notch parts 83 are formed in each of the pair of the partition 81 and 82, however, the embodiment of the present invention is not limited thereto. For example, the notch part 83 may be formed only in the partition 81 corresponds to the clutch reservoir chamber 93 to which the connecting port 97 is provided. As such, it is possible to reduce an amount of brake fluid which is not used and is just reserved.

[Second Embodiment]

Next, a second embodiment will be described focusing on portions different from those of the first embodiment mainly based on FIGS. 10 to 12. Further, for parts that are in common with the first embodiment, the same name and reference character are used.

In the second embodiment, the extension sidewall parts 56, the intermediate front wall part 29, the front bottom part 30, and the front end wall part 31 of the first embodiment are not formed on the lower constituent body 23. Instead, a front wall part 130 that extends in a width direction is formed along a vertical direction so as to connect the front end edges of sidewall parts 26 and 27 to each other. The front edges of partitions 81 and 82 are located on the side of a rear wall part 28 rather than the front wall part 130. Partitions 85 and 86 are also located on the side of the rear wall part 28 rather than the front wall part 130. Thus, one of the partitions 85 and 86 corresponding to the sidewall parts 26 and 27 is connected at a middle position of the corresponding sidewall part 26 or 27 in a length direction. As a result, as in the first embodiment, a level of fluid of a brake reservoir chamber 105 is indicated on the front side of the sidewall part 26 rather than the partition 85 and on the front side of the sidewall part 27 rather than the partition 86. Further, a level of fluid of a clutch reservoir chamber 93 is indicated on the rear side of the sidewall part 26 rather than the partition 85, and a level of fluid of a clutch reservoir chamber 94 is indicated on the rear side of the sidewall part 27 rather than the partition 86.

In the second embodiment, rear ends of the partitions 81 and 82 of the lower constituent body 23 are not connected to the rear wall part 28. Further, only the partition 81 among the partitions 81 and 82 has the notch part 83 described in the first embodiment. A rear connecting partition (a connecting partition) 131 is formed so as to connect the rear ends of the partitions 81 and 82 to each other. In detail, the rear connecting partition 131 extends upward from a main bottom part 25 in a vertical direction in a posture that extends in a width direction. A left end edge of the rear connecting partition 131 is connected to a rear end edge of the partition 81 throughout its height, and a right end edge of the rear connecting partition 131 is connected to a rear end edge of the partition 82 throughout its height. The rear connecting partition 131 is formed spaced apart from the rear wall part 28 on the rear side of the lower constituent body 23 which faces the outside. Further, the notch part 83 may be formed in both the partition 81 and the partition 82 rather than only the partition 81, and may be formed in only the partition 82. Further, the notch part 83 may be formed in one of the partition 85, the partition 86, and the rear connecting partition 131, or all of them.

Thus, the clutch reservoir chamber 93 that is located inside the partitions 81 and 85 and a rear region of the sidewall part 26 rather than the partition 85, and the clutch reservoir chamber 94 that is located inside the partitions 82 and 86 and a rear region of the sidewall part 27 rather than the partition 86 always communicate with each other via a rear communication clutch reservoir chamber 132 between the rear connecting partition 131 and the rear wall part 28. In other words, the rear connecting partition 131 that is formed uprightly by connection between the partitions 81 and 82 connects the clutch reservoir chambers 93 and 94 to each other. The clutch reservoir chambers 93 and 94 and the rear communication clutch reservoir chamber 132 have a U shape as a whole when viewed from the top.

Figure 10:
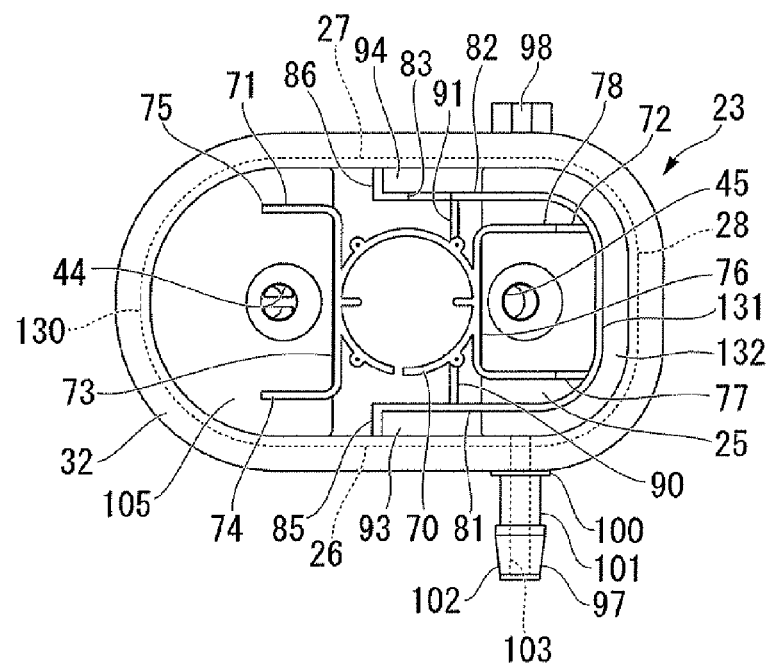
FIG. 10 is a plan view showing a lower constituent body of a reservoir according to a second embodiment of the present invention.
Figure 11:
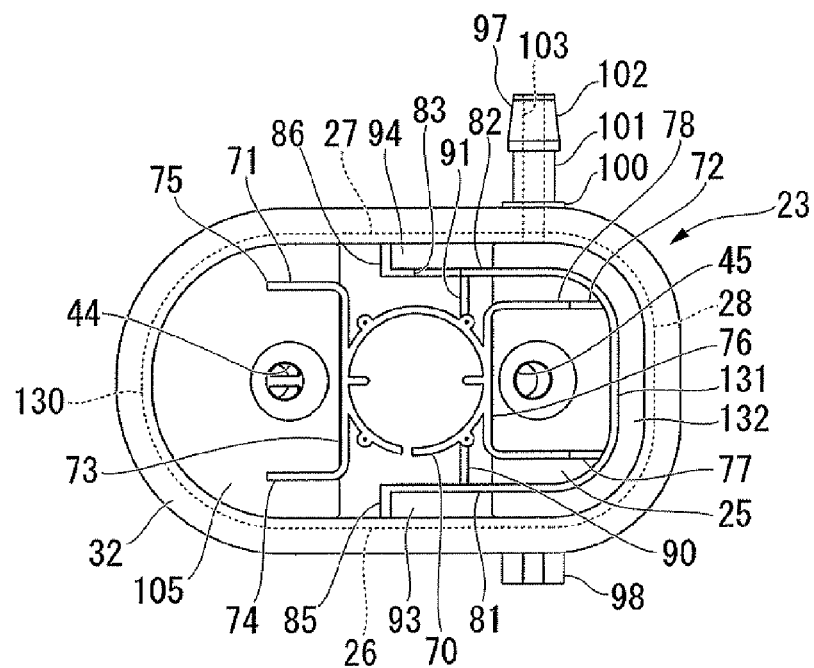
FIG. 11 is a plan view showing another lower constituent body of the reservoir according to the second embodiment of the present invention.

In the second embodiment as well, as shown in FIGS. 10 and 11, one of the sidewall parts 26 and 27 is provided with a connecting port 97 that protrudes in a direction perpendicular thereto, and the other is provided with a projection 98 that is shorter than the connecting port 97 and protrudes in a direction perpendicular thereto. In this case, when the connecting port 97 and the projection 98 are formed on the sidewall part 26, they are formed at positions that face the clutch reservoir chamber 93. When the connecting port 97 and the projection 98 are formed on the sidewall part 27, they are formed at positions that face the clutch reservoir chamber 94.

Figure 12:
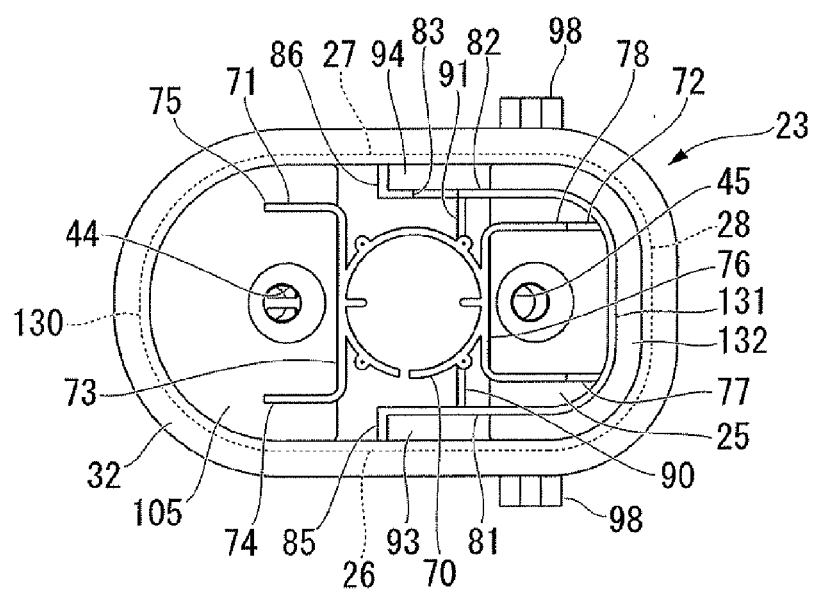
FIG. 12 is a plan view showing another lower constituent body of the reservoir according to the second embodiment of the present invention.

Further, as a technical reference, even in this case, as shown in FIG. 12, it may be possible to easily form the lower constituent body 23 of the reservoir, which is not connected to the clutch master cylinder 17, and on both sides of which the projections 98 are formed.

According to the second embodiment described above, the reservoir includes the rear connecting partition 131 that is formed uprightly by connection between the partitions 81 and 82 and connects the clutch reservoir chambers 93 and 94 to each other. As such, even when the connecting port 97 communicates with one of the clutch reservoir chambers 93 and 94, all of the clutch reservoir chambers 93 and 94 and the rear communication clutch reservoir chamber 132 communicate with the connecting port 97. Accordingly, since no clutch reservoir chambers store an ineffective fluid, it is possible to promote an overall reduction in size. Further, since it is possible to reduce lengths of the clutch reservoir chambers 93 and 94 after securing their volumes, the visibility of stored fluid of the brake reservoir chamber 105 is improved. In addition, it is possible to observe stored fluid of the clutch reservoir chambers 93 and 94 and the rear communication clutch reservoir chamber 132 that communicate with each other from both the left and right sides.

Further, since the rear connecting partition 131 is formed spaced apart from the rear wall part 28 of the rear direction of the vehicle, when the connecting port 97 is formed at a rear portion of the lower constituent body 23, it is possible to promote an overall reduction in size.

[Third Embodiment]

Next, a third embodiment will be described focusing on portions different from those of the first embodiment mainly based on FIGS. 13 to 15. Further, for parts that are in common with the first embodiment, the same name and reference character are used.

In the third embodiment, the extension sidewall parts 56, the intermediate front wall part 19, the front bottom part 30, and the front end wall part 31 of the first embodiment are not formed on the lower constituent body 23. Instead, a front wall part 140 that extends in a width direction is formed along a vertical direction to connect the front end edges of sidewall parts 26 and 27 to each other.

In the third embodiment, partitions 81 and 82 of the lower constituent body 23 are formed at a front portion of the lower constituent body 23. Further, as in the second embodiment, only one partitions 81 has the notch part 83 described in the first embodiment.

In addition, in the third embodiment, a pair of partitions 85 and 86 are formed at the rear positions of the partitions 81 and 82. One partition 85 is configured so that one end edge thereof on the side of the adjacent sidewall part 26 is connected to the sidewall part 26 throughout its height, and so that the other end edge thereof is connected to a rear edge of the adjacent partition 81 throughout its height. The other partition 86 is configured so that one end edge thereof on the side of the adjacent sidewall part 27 is connected to the sidewall part 27 throughout its height, and so that the other end edge thereof is connected to a rear edge of the adjacent partition 82 throughout its height. The rear edges of the partitions 81 and 82 are located on the side of a rear wall part 28 rather than the front wall part 140, and the partitions 85 and 86 are also located on the side of the rear wall part 28 rather than the front wall part 140.

One clutch reservoir chamber 93 is defined by and inside the partitions 81 and 85 and a front region of the sidewall part 26 rather than the partition 85, all of which are located on the same side in the width direction. The other clutch reservoir chamber 94 is defined by and inside the partitions 82 and 86 and a front region of the sidewall part 27 rather than the partition 86, all of which are located on the other side in the width direction. One of the partitions 85 and 86 corresponding to the sidewall parts 26 and 27 is connected at a middle position of the corresponding sidewall part 26 or 27 in a length direction. As a result, a level of fluid of a brake reservoir chamber 105 is indicated on the rear side of the sidewall parts 26 and 27 rather than the partitions 85 and 86. Further, a level of fluid of the clutch reservoir chamber 93 is indicated on the front side of the sidewall part 26 rather than the partition 85, and a level of fluid of the clutch reservoir chamber 94 is indicated on the front side of the sidewall part 27 rather than the partition 86.

In addition, the front ends of the partitions 81 and 82 are also located on the side of the rear wall part 28 rather than the front wall part 140. A front connecting partition (a connecting partition) 141 is formed so as to connect the front ends of the partitions 81 and 82 to each other. In detail, the front connecting partition 141 extends upward from a main bottom part 25 in a vertical direction in a posture that extends in a width direction. A left end edge of the front connecting partition 141 is connected to a front end edge of the partition 81 throughout its height, and a right end edge of the front connecting partition 141 is connected to a front end edge of the partition 82 throughout its height. The front connecting partition 141 is formed spaced apart from the front wall part 140 on the front side of the lower constituent body 23 which faces the outside. Further, the notch part 83 may be formed in the front connecting partition 141.

Thus, the clutch reservoir chamber 93 that is located inside the partitions 81 and 85 and a front region of the sidewall part 26 rather than the partition 85, and the clutch reservoir chamber 94 that is located inside the partitions 82 and 86 and a front region of the sidewall part 27 rather than the partition 86 always communicate with each other via a front communication clutch reservoir chamber 142 between the front connecting partition 141 and the front wall part 140. In other words, the front connecting partition 141 that is formed uprightly by connection between the partitions 81 and 82 connects the clutch reservoir chambers 93 and 94 to each other. The clutch reservoir chambers 93 and 94 and the front communication clutch reservoir chamber 142 have a U shape as a whole when viewed from the top.

Figure 13:
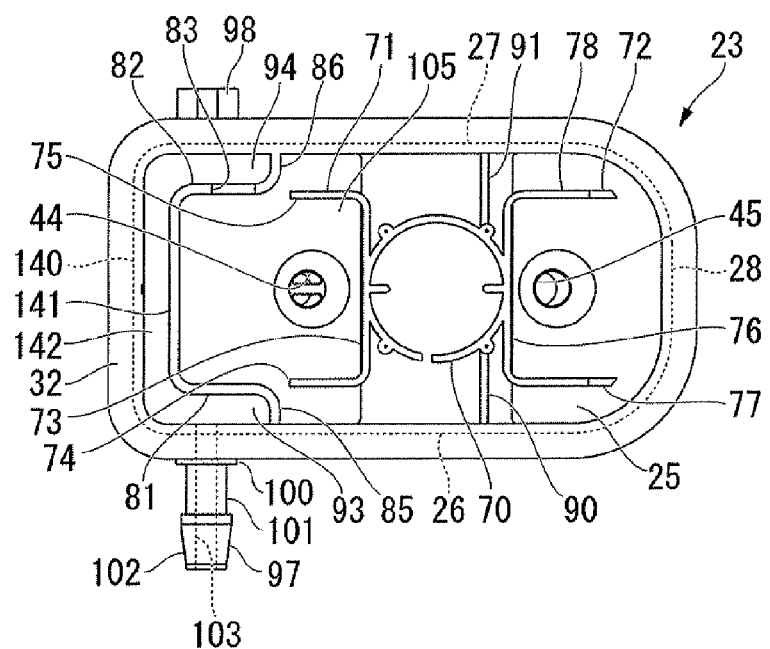
FIG. 13 is a plan view showing a lower constituent body of a reservoir according to a third embodiment of the present invention.
Figure 14:
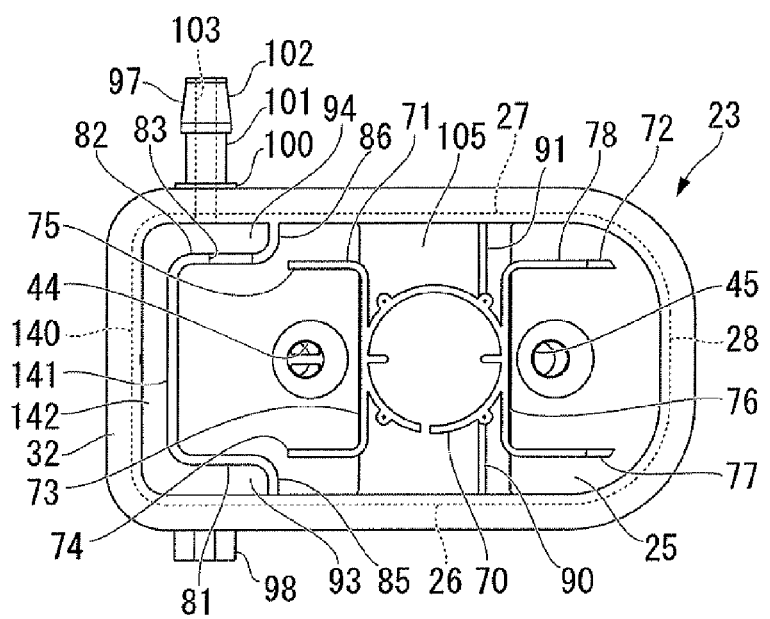
FIG. 14 is a plan view showing another lower constituent body of the reservoir according to the third embodiment of the present invention.

In the third embodiment as well, as shown in FIGS. 13 and 14, one of the sidewall parts 26 and 27 is provided with a connecting port 97 that protrudes in a direction perpendicular thereto, and the other is provided with a projection 98 that is shorter than the connecting port 97 and protrudes in a direction perpendicular thereto. In this case, when the connecting port 97 and the projection 98 are formed on the sidewall part 26, they are formed at positions that face the clutch reservoir chamber 93. When the connecting port 97 and the projection 98 are formed on the sidewall part 27, they are formed at positions that face the clutch reservoir chamber 94.

Figure 15:
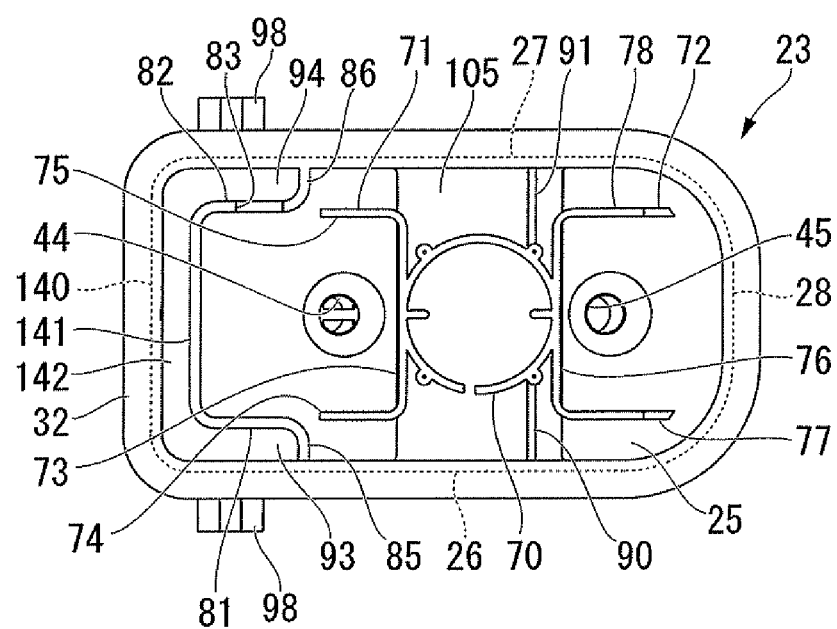
FIG. 15 is a plan view showing another lower constituent body of the reservoir according to the third embodiment of the present invention.

Further, as a technical reference, even in this case, as shown in FIG. 15, it may be possible to easily form the lower constituent body 23 of the reservoir, which is not connected to the clutch master cylinder 17, and on both sides of which the projections 98 are formed.

According to the third embodiment described above, the reservoir includes the front connecting partition 141 that is formed uprightly by connection between the partitions 81 and 82 and connects the clutch reservoir chambers 93 and 94 to each other. As such, even when the connecting port 97 communicates with one of the clutch reservoir chambers 93 and 94, all of the clutch reservoir chambers 93 and 94 and the front communication clutch reservoir chamber 142 communicate with the connecting port 97. Accordingly, since no clutch reservoir chambers store an ineffective fluid, it is possible to promote an overall reduction in size. Further, since it is possible to reduce lengths of the clutch reservoir chambers 93 and 94 after securing their volumes, the visibility of stored fluid of the brake reservoir chamber 105 is improved. In addition, it is possible to observe stored fluid of the clutch reservoir chambers 93 and 94 and the front communication clutch reservoir chamber 142 that communicate with each other from both the left and right sides.

Further, since the front connecting partition 141 is formed spaced apart from the front wall part 140 of the rear direction of the vehicle, when the connecting port 97 is formed at a front portion of the lower constituent body 23, it is possible to promote an overall reduction in size.

According to the first to third embodiments, in a reservoir having a brake reservoir chamber in which fluid is stored and which is connected to a brake master cylinder, and clutch reservoir chambers which are partitioned from the brake reservoir chamber, in which fluid is stored, and which are connected to a clutch master cylinder, first partitions partitioning the brake reservoir chamber and the clutch reservoir chambers from each other extend in the length direction of a vehicle in an formed uprightly state to run parallel to the sidewalls. Second partitions that connect the first partitions and the sidewalls adjacent to the first partitions are formed uprightly at middle positions of the sidewalls in the length direction of the vehicle. The brake reservoir chamber and the clutch reservoir chambers are formed so as to face the respective sidewalls. One of the sidewalls which the clutch reservoir chambers face is provided with a connecting port connected to the clutch master cylinder. As such, good visibility from the outside is obtained with respect to levels of the fluid of the clutch reservoir chambers as well as the level of the fluid of the brake reservoir chamber.

Further, according to the first to third embodiments, the first partitions and the second partitions are formed uprightly to be symmetrical with respect to the sidewalls. As such, the clutch reservoir chamber that is partitioned by one of the first partitions, one of the second partitions, and one of the sidewalls, and the clutch reservoir chamber that is partitioned by the other of the first partitions, the other of the second partitions, and the other of the sidewalls can have the same volume. Thus, even when the connecting port is formed in one of the sidewalls, it is possible to connect the clutch master cylinder to the clutch reservoir chambers having the same volume.

Further, according to the first to third embodiments, each sidewall has a fluid level display line indicating the fluid level across the brake reservoir chamber and the clutch reservoir chambers. As such, it is possible to manage the fluid level of each clutch reservoir chamber as well as the fluid level of the brake reservoir chamber in an easy and proper manner.

Further, according to the first embodiment, the first partitions are connected to a rear wall of a rear direction of the vehicle on the opposite side from the side connected with the second partitions. Further, the first partitions are not limited thereto. Thus, the first partitions may be connected to a front wall of a front direction of the vehicle on the opposite side from the side connected with the second partitions.

Further, according to the first embodiment, the first partitions are provided with communication passages connecting the brake reservoir chamber and the clutch reservoir chambers to each other. Further, the present invention is not limited thereto. The communication passage may be formed in only one of the first partitions which corresponds to the clutch reservoir chamber connected with the clutch master cylinder.

Further, according to the second and third embodiments, a connecting partition that is formed uprightly by connection of the first partitions and connects the clutch reservoir chambers to each other is provided. As such, even when the connecting port communicates with one of the clutch reservoir chambers, both of the clutch reservoir chambers communicate with the connecting port. Accordingly, since no clutch reservoir chambers store an ineffective fluid, it is possible to promote an overall reduction in size.

Further, according to the second and third embodiments, the communication passage connecting the brake reservoir chamber and the clutch reservoir chamber to each other is formed in one of the first partitions. Further, the present invention is not limited thereto. The communication passage may be formed in each of the first partitions. Further, the communication passage may be formed in the first partitions as well as the second partitions, or in the connecting partition.

Further, according to the second embodiment, the connecting partition is formed spaced apart from the rear wall of the rear direction of the vehicle. As such, when the connecting port is formed on the rear portion, it is possible to adequately promote an overall reduction in size.

Further, according to the third embodiment, the connecting partition is formed spaced apart from the front wall of the front direction of the vehicle. As such, when the connecting port is formed on the front portion, it is possible to adequately promote an overall reduction in size.

While exemplary embodiments of the present invention have been described, the present invention is not limited to these embodiments. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A reservoir comprising:
a reservoir body which has at least one pair of sidewalls;
a brake reservoir chamber in which fluid is stored and which is connected to a brake master cylinder;
clutch reservoir chambers which are partitioned from the brake reservoir chamber, in which fluid is stored, and which are connected to a clutch master cylinder;
a connecting port which is formed on one of the sidewalls with which the clutch reservoir chambers are in contact; and
partitions which partition the brake reservoir chamber and the clutch reservoir chambers, wherein
the partitions include first partitions and second partitions,
the first partitions extend in a length direction of the vehicle and are formed uprightly along the sidewalls,
the second partitions are formed uprightly at middle positions of the sidewalls in the length direction of the vehicle to connect the first partitions and the sidewalls adjacent to the first partitions and to bring the brake reservoir chamber and the clutch reservoir chambers into contact with the sidewalls, and
the first partitions and the second partitions are formed to have a mirror symmetrical shape with respect to a plane that passes through a center of reservoir body in a width direction.

2. The reservoir according to claim 1, wherein the first partitions are connected to a rear wall provided in a rear direction of the vehicle on an opposite side from a side connected with the second partitions.

3. The reservoir according to claim 1, wherein the first partitions include communication passages connecting the brake reservoir chamber and the clutch reservoir chambers to each other.

4. The reservoir according to claim 1, further comprising a connecting partition that is formed uprightly by connection between the first partitions and connects the clutch reservoir chambers to each other.

5. The reservoir according to claim 4, wherein the connecting partition is formed spaced apart from a rear wall provided in a rear direction of the vehicle.

6. The reservoir according to claim 4, wherein the connecting partition is formed spaced apart from a front wall provided in a front direction of the vehicle.

7. The reservoir according to claim 4, wherein one of the first partitions includes a communication passage connecting the brake reservoir chamber and the clutch reservoir chamber to each other.

8. The reservoir according to claim 1, wherein the first partitions and the second partitions are formed uprightly to be symmetrical with respect to the sidewalls.

9. The reservoir according to claim 1, wherein each of the sidewalls has a fluid level display line indicating a level of the fluid across the brake reservoir chamber and the clutch reservoir chamber.

10. A reservoir having at least one pair of sidewalls, comprising:
a brake reservoir chamber that is connected to a brake master cylinder by communication holes formed in a bottom part;
clutch reservoir chambers that are partitioned from the brake reservoir chamber and are connected to a clutch master cylinder by a connecting port formed on one of the sidewalls; and
partitions that include first partitions and second partitions which partition the brake reservoir chamber and the clutch reservoir chambers, wherein
the first partitions extend in an axial direction of the brake master cylinder and are formed uprightly along the sidewalls,
the second partitions are formed uprightly in a direction perpendicular to the axial direction of the brake master cylinder to connect the first partitions and the sidewalls adjacent to the first partitions and to bring the brake reservoir chamber and the clutch reservoir chambers into contact with the sidewalls, and
the first partitions are connected to a rear wall provided in a rear direction of a vehicle on an opposite side from a side connected with the second partitions.

11. The reservoir according to claim 10, wherein the first partitions include communication passages connecting the brake reservoir chamber and the clutch reservoir chambers to each other.

12. The reservoir according to claim 10, further comprising a connecting partition that is formed uprightly by connection between the first partitions and connects the clutch reservoir chambers to each other.

13. The reservoir according to claim 10, wherein the first partitions and the second partitions are formed uprightly to be symmetrical with respect to the sidewalls.

14. The reservoir according to claim 10, wherein each of the sidewalls has a fluid level display line indicating a level of fluid across the brake reservoir chamber and the clutch reservoir chamber.

15. A brake master cylinder generating a brake fluid pressure, the brake master cylinder comprising:
a cylinder body having a hydraulic chamber in which a piston moves formed therein and attachment boss parts formed on an upper portion thereof;
a reservoir that is attached to the attachment boss parts of the cylinder body and has a brake reservoir chamber and clutch reservoir chambers inside at least one pair of sidewalls; and
partitions that include first partitions and second partitions which partition the brake reservoir chamber and the clutch reservoir chambers, wherein
the first partitions extend in an axial direction of the cylinder body and are formed uprightly along the sidewalls,
the second partitions are formed uprightly in a direction perpendicular to the axial direction of the cylinder body to connect the first partitions and the sidewalls adjacent to the first partitions and to bring the brake reservoir chamber and the clutch reservoir chambers into contact with the sidewalls, and
the first partitions and the second partitions are formed to have a mirror symmetrical shape with respect to a plane that passes through a center of the reservoir in a width direction.

16. The brake master cylinder according to claim 15, wherein the first partitions are connected to a rear wall provided in a rear direction of the vehicle on an opposite side from a side connected with the second partitions.

17. The brake master cylinder according to claim 15, wherein the first partitions include communication passages connecting the brake reservoir chamber and the clutch reservoir chambers to each other.

18. The brake master cylinder according to claim 15, wherein the first partitions and the second partitions are formed uprightly to be symmetrical with respect to the respective sidewalls.

19. The brake master cylinder according to claim 15, wherein each of the sidewalls has a fluid level display line indicating a level of fluid across the brake reservoir chamber and the clutch reservoir chamber.

* * * * *